(12) United States Patent
Wookey et al.

(10) Patent No.: US 7,243,265 B1
(45) Date of Patent: Jul. 10, 2007

(54) NEAREST NEIGHBOR APPROACH FOR IMPROVED TRAINING OF REAL-TIME HEALTH MONITORS FOR DATA PROCESSING SYSTEMS

(75) Inventors: Michael J. Wookey, Los Gatos, CA (US); Kenneth C. Gross, San Diego, CA (US); Lawrence G. Votta, Jr., Sammamish, WA (US)

(73) Assignee: Sun Microsystems, Inc., Palo Alto, CA (US)

( * ) Notice: Subject to any disclaimer, the term of this patent is extended or adjusted under 35 U.S.C. 154(b) by 617 days.

(21) Appl. No.: 10/690,917

(22) Filed: Oct. 22, 2003

Related U.S. Application Data

(60) Provisional application No. 60/469,767, filed on May 12, 2003.

(51) Int. Cl.
*G06F 11/00* (2006.01)

(52) U.S. Cl. .......................................... 714/37; 714/48
(58) Field of Classification Search .................. 714/25, 714/37, 48
See application file for complete search history.

(56) References Cited

U.S. PATENT DOCUMENTS

| | | | | |
|---|---|---|---|---|
| 4,847,795 A | * | 7/1989 | Baker et al. ................. 702/184 |
| 5,446,874 A | * | 8/1995 | Waclawsky et al. ........... 714/1 |
| 5,500,940 A | * | 3/1996 | Skeie .......................... 714/25 |
| 6,163,849 A | * | 12/2000 | Nouri et al. ................. 713/324 |
| 6,208,955 B1 | * | 3/2001 | Provan et al. ................. 703/20 |
| 6,223,306 B1 | * | 4/2001 | Silva et al. .................... 714/37 |
| 6,826,714 B2 | * | 11/2004 | Coffey et al. ................. 714/25 |
| 6,938,243 B1 | * | 8/2005 | Zeevi et al. ................. 717/124 |
| 7,007,200 B2 | * | 2/2006 | Salem .......................... 714/26 |
| 7,020,569 B2 | * | 3/2006 | Cao et al. .................... 702/108 |
| 2003/0018928 A1 | * | 1/2003 | James et al. .................. 714/25 |
| 2004/0078723 A1 | * | 4/2004 | Gross et al. .................. 714/47 |
| 2004/0199573 A1 | * | 10/2004 | Schwartz et al. ........... 709/201 |
| 2005/0188269 A1 | * | 8/2005 | El-Shimi et al. .............. 714/38 |

\* cited by examiner

*Primary Examiner*—Scott Baderman
*Assistant Examiner*—Brian Assessor
(74) *Attorney, Agent, or Firm*—Sonnenschein Nath & Rosenthal LLP

(57) ABSTRACT

Methods, systems, and articles of manufacture consistent with the present invention train a real-time health-monitor for a computer-based system while simultaneously monitoring the health of the system. A plurality of signals that each describe an operating condition of a subject data processing system are monitored in real-time. It is determined whether there is a problem with the subject data processing system by comparing at least one of the monitored signals to a corresponding at least one signal in a known signal dataset. The known signal dataset includes a signal value for at least one signal that describes an operating condition of one of a plurality of subject data processing systems. A new signal dataset having an entry for each monitored signal and a corresponding signal value is prepared simultaneously with monitoring the plurality of signals and determining whether there is a problem.

41 Claims, 5 Drawing Sheets

NEAREST NEIGHBOR APPROACH FOR IMPROVED TRAINING OF REAL-TIME HEALTH MONITORS FOR DATA PROCESSING SYSTEMS

CROSS-REFERENCE TO RELATED APPLICATIONS

This Application claims the benefit of the filing date and priority to the following patent applications, all of which are incorporated herein by reference to the extent permitted by law:

U.S. Provisional Application Ser. No. 60/469,767, entitled "METHODS AND SYSTEMS FOR INTELLECTUAL CAPITAL SHARING AND CONTROL", filed May 12, 2003.

Additionally, this Application is related to the following U.S. patent applications, which are filed concurrently with this Application, and which are incorporated herein by reference to the extent permitted by law:

Ser. No. 10/690,866, entitled "DYNAMIC RULE DEPLOYMENT FOR A SCALEABLE SERVICES RULES ENGINE";

Ser. No. 10/691,278, entitled "PREDICTING COMPONENT FAILURE BASED ON PATTERN RECOGNITION OF SUBCOMPONENT EXPOSURE TO FAILURE";

Ser. No. 10/690,951, entitled "MANAGING EXPOSURE TO FAILURE FOR COMPUTER BASED SYSTEMS"; and Ser. No. 10/690,952, entitled "MANAGING AND PREDICTING RISK FOR COMPUTER DEVICES USING EXPOSURE MANAGEMENT TECHNIQUES".

FIELD OF THE INVENTION

The present invention relates to monitoring the health of data processing systems, and in particular, to training data processing system health monitors.

BACKGROUND OF THE INVENTION

Fault detection in data processing systems typically requires costly on-line monitoring and expertise. Conventional approaches to identifying faults, such as combining event correlation and threshold-based rules, have proven inadequate in a variety of safety-critical industries with complex, heterogeneous subsystem inputs, such as those found in enterprise computing. Although these typical enterprise systems may be rich in instrumentation for acquiring diagnostic data to be used in identifying faults, the acquired data is typically complex, non-uniform, and difficult to correlate.

Conventional approaches have somewhat improved their results by coupling real-time health monitoring of system performance metrics with a fault management architecture and the use of pattern recognition to correlate potential faults with the performance metrics. The effectiveness of these approaches are grated, however, by the quality of the information available from instrumentation. It has become necessary to be able to capture unambiguous diagnostic information that can quickly pinpoint the source of the defects in hardware or software. If systems have too little event monitoring, then when problems occur, services organization engineers may be unable to quickly identify the source of the problems. This can lead to increased customer downtime, impacting customer satisfaction and loyalty to the services organization. One approach to address this real-time health monitoring issue has been to monitor numerous time series relating to performance, throughput, and physical operating conditions, and to couple these telemetry signals with a data-driven pattern recognition system to proactively identify problematic discrepancies in system performance parameters and direct service personal more efficiently.

In one conventional approach, a health-monitoring module uses a statistical pattern recognition technique to monitor telemetry signals from which it learns the patterns of interactions among all the available signals when the system is behaving normally. This is called a training mode. The health-monitoring module is then put in a surveillance mode, and can detect with sensitivity the incipience or onset of anomalous patterns, degraded performance, or faulty sensors.

It has been conventionally desirable that the signals collected during the training period meet two conventional criteria:

Conventional Training Criteria 1: The training signals should be acquired when the system is new or can otherwise be certified to be operating with no degradation in any of the monitored sensors, components, or subsystems. If the health-monitoring module is trained with data from a system already containing degradation in one or more signals, it conventionally will not be able to recognize the degradation in those signals when it is subsequently placed in the surveillance mode.

Conventional Training Criteria 2: The training signals should encompass the full dynamic range of the system under surveillance. For example, if a health-monitoring module uses pattern recognition to monitor a mechanical machine, one would typically want to collect training signals while the machine is operating from 0 to 100% of its operating range. For a machine such as an automobile engine, one would typically want to collect training signals while the engine is at idle, and while the engine is under conditions of acceleration and deceleration through the expected range of speed the vehicle will subsequently use, including a range of up- and down-hill grades expected to be encountered. Similarly, for a computer server, one typically wants to collect training signals during a weekend or other minimal-load time, during one or more busy afternoons, and with a mixture of running applications to ensure that the server's input/output channels, memory utilization, and processing units see a broad range of utilization.

The practical effect of Conventional Training Criterion 2 is that several days worth of training data should be acquired before placing the health-monitoring module into its surveillance mode. Conventional Training Criterion 1 is easy to meet for a brand new system that has just been thoroughly evaluated in factory quality control testing; however, Conventional Training Criterion 1 becomes more difficult to satisfy for vintage systems. In this case, it is typically necessary to have services organization engineers check out all subsystems thoroughly after any configuration modification that would require re-training.

It is therefore desirable to provide a real-time health-monitoring system that can train on an already-implemented system without the system having to be checked out prior to the training. It is further desirable to perform accurate real-time health-monitoring of the system during the training.

SUMMARY OF THE INVENTION

Methods, systems, and articles of manufacture consistent with the present invention train a real-time health monitor for a computer-based system while simultaneously monitoring the health of the system. A program monitors the health of a subject data processing system using a pattern recognition technique to compare signals that describe the operating state of the subject system against signal values in a known signal dataset, which is referred to as a training dataset. The program retrieves the known training dataset from a database of known training datasets by comparing the available signals to be monitored with the signal types in the known training datasets. If an exact match is found in the database, then that known training dataset is used for monitoring. Otherwise, a nearest matching known training dataset is used. While monitoring the subject system, the program simultaneously prepares a new training dataset for the subject system with the real-time monitored available signals.

In an illustrative example, the program is used to monitor a high-end server. There are 1000 data signals being gathered about the server. 300 of the signals relate to physical characteristics. 600 of the signals relate to performance characteristics. And 100 of the signals relate to canary variables. Before monitoring the server, the program compares the signals to be monitored against the signal types present in each known training dataset in a database. There is no exact match, so the program retrieves a nearest match, which has similar stored signal types for 320 physical variables, 610 performance variables, and 100 canary variables. While monitoring the server, the program analyses the server signals that correspond to those in the known training dataset to determine whether there is a problem with the server. At the same time the program also build a new training dataset for all 1000 data signals gathered about the server. Therefore, the new training dataset is created while the server's health is being monitored.

In accordance with methods consistent with the present invention, a method in a data processing system having a program is provided. The method comprises the steps performed by the program of: monitoring in real-time a plurality of signals that each describe an operating condition of a subject data processing system; determining whether there is a problem with the subject data processing system by comparing at least one of the monitored signals to a corresponding at least one signal in a known signal dataset, the known signal dataset comprising a signal value for at least one signal that describes an operating condition of one of a plurality of subject data processing systems; and preparing a new signal dataset having an entry for each monitored signal and a corresponding signal value simultaneously with monitoring the plurality of signals and determining whether there is a problem.

In accordance with articles of manufacture consistent with the present invention, a computer-readable medium containing instructions that cause a data processing system having a program to perform a method is provided. The method comprises the steps performed by the program of: monitoring in real-time a plurality of signals that each describe an operating condition of a subject data processing system; determining whether there is a problem with the subject data processing system by comparing at least one of the monitored signals to a corresponding at least one signal in a known signal dataset, the known signal dataset comprising a signal value for at least one signal that describes an operating condition of one of a plurality of subject data processing systems; and preparing a new signal dataset having an entry for each monitored signal and a corresponding signal value simultaneously with monitoring the plurality of signals and determining whether there is a problem.

In accordance with systems consistent with the present invention, a data processing system is provided. The data processing system comprises:
  a memory having a program that
    monitors in real-time a plurality of signals that each describe an operating condition of a subject data processing system,
    determines whether there is a problem with the subject data processing system by comparing at least one of the monitored signals to a corresponding at least one signal in a known signal dataset, the known signal dataset comprising a signal value for at least one signal that describes an operating condition of one of a plurality of subject data processing systems, and
    prepares a new signal dataset having an entry for each monitored signal and a corresponding signal value simultaneously with monitoring the plurality of signals and determining whether there is a problem; and
  a processing unit that runs the program.

In accordance with systems consistent with the present invention, a data processing system in provided. The data processing system comprises: means for monitoring in real-time a plurality of signals that each describe an operating condition of a subject data processing system; means for determining whether there is a problem with the subject data processing system by comparing at least one of the monitored signals to a corresponding at least one signal in a known signal dataset, the known signal dataset comprising a signal value for at least one signal that describes an operating condition of one of a plurality of subject data processing systems; and means for preparing a new signal dataset having an entry for each monitored signal and a corresponding signal value simultaneously with monitoring the plurality of signals and determining whether there is a problem In accordance with articles of manufacture consistent with the present invention, a computer-readable memory device encoded with a program having a data structure with a plurality of entries is provided. The program is run by a processor in a data processing system. Each entry comprises: a signal data of a monitored operating condition of a monitored data processing system, the program storing the signal data in the entry while simultaneously determining whether there is a problem with the monitored data processing system by comparing the signal data to a corresponding entry in a second data structure, the second data structure having a plurality of entries that each describe an operating condition of one of a plurality of monitored data processing systems.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention train a real-time health monitor for a computer-based system while simultaneously monitoring the health of the system. A program monitors the health of a subject data processing system using a pattern recognition technique to compare signals that describe the operating state of the subject system against signal values in a known signal dataset, which is referred to as a training dataset. The program retrieves the known training dataset from a database of known training datasets by comparing the available signals to be monitored with the signal types in the known training datasets. If an exact match is found in the database, then that known training dataset is used for monitoring. Otherwise, a nearest matching known training dataset is used. While monitoring the subject system, the program simultaneously prepares a new training dataset for the subject system with the real-time monitored available signals.

As the program trains on an increasing number of subject systems, the database will include training datasets for an increasing number of configuration permutations observed on the subject systems. Those configurations for which there is a matching training dataset will require no training period, and can be monitored with high sensitivity from the moment they are first booted up. If any configurations that are not found in the database, then the nearest neighbor training dataset will enable immediate surveillance using a training dataset that may not be perfect, but will nevertheless give reasonable surveillance benefits for the time required to generate a new, customized training dataset.

Figure 1:
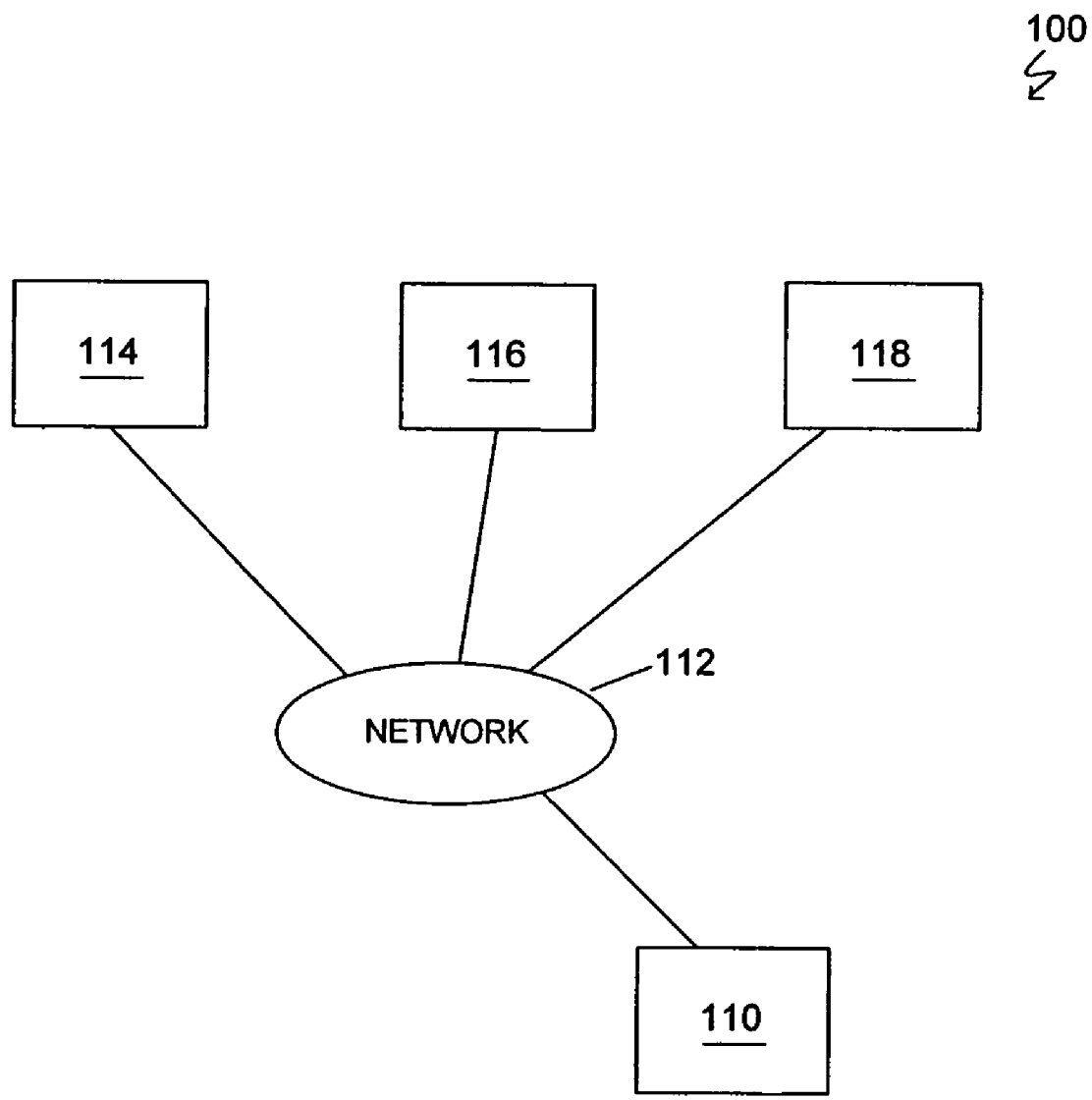
FIG. 1 shows a block diagram illustrating a data processing system in accordance with methods and systems consistent with the present invention.

FIG. 1 depicts a block diagram of a data processing system 100 suitable for use with methods and systems consistent with the present invention. Data processing system 100 comprises a monitor data processing system 110 ("the monitor system") connected to a network 112. The monitor system is, for example, a services organization system used to monitor other data processing systems. The network is any suitable network for use with methods and systems consistent with the present invention, such as a Local Area Network Wide Area Network or the Internet. At least one subject data processing system 114 ("the subject system") is also connected to the network. The subject system is a data processing system to be monitored by the monitor system and can be any data processing system suitable for use with methods and systems consistent with the present invention. In the illustrative example, the subject system is a server. As shown there can be a plurality of subject systems 114, 116, and 118, each capable of being monitored by the monitor system.

Figure 2:
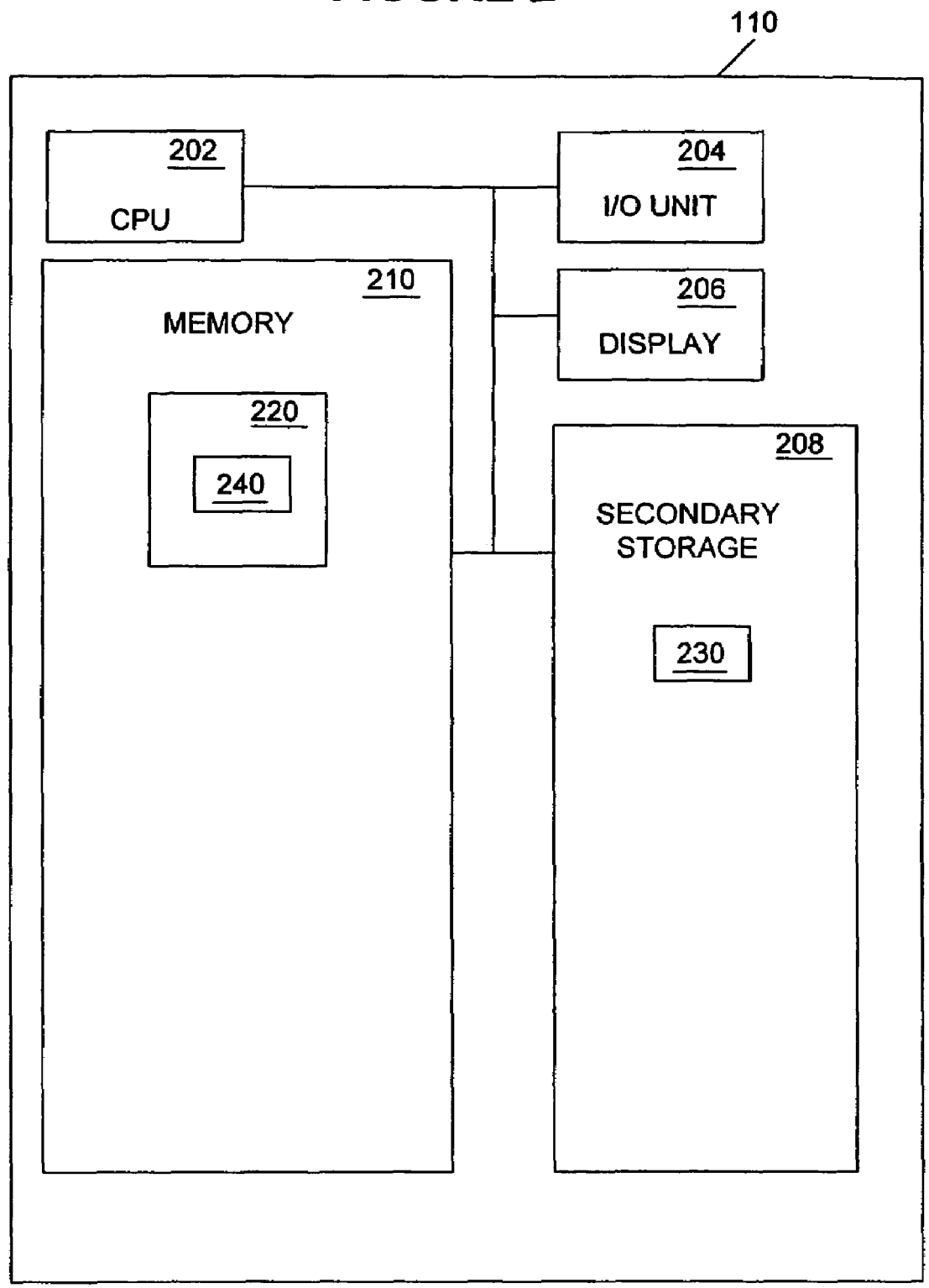
FIG. 2 shows a block diagram of a monitoring system in accordance with methods and systems consistent with the present invention.

FIG. 2 depicts a more detailed view of monitor system 110. The monitor system comprises a central processing unit (CPU) 202, an input/output (I/O) unit 204, a display device 206, a secondary storage device 208, and a memory 210. The monitor system may further comprise standard input devices such as a keyboard, a mouse or a speech processing means (each not illustrated).

Memory 210 contains a program 220 that monitors in real-time the health of the subject system. The program may comprise or may be included in one or more code sections containing instructions for performing their respective operations. While the program 220 is described as being implemented as software, the present implementation may be implemented as a combination of hardware and software or hardware alone. Also, one having skill in the art will appreciate that program may comprise or may be included in a data processing device, which may be a client or a server, communicating with monitor system 110.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 100 have been described, one skilled in the art will appreciate that a data processing system suitable for use with methods, systems, and articles of manufacture consistent with the present invention may contain additional or different components.

One having skill in the art will appreciate that the monitor system can itself also be implemented as a client-server data processing system. In that case, program 220 can be stored on the monitor system as a client, while some or all of the steps of the processing of the program described below can be carried out on a remote server, which is accessed by the client over the network. The remote server can comprise components similar to those described above with respect to the monitor system, such as a CPU, an I/O, a memory, a secondary storage, and a display device.

Figure 3:
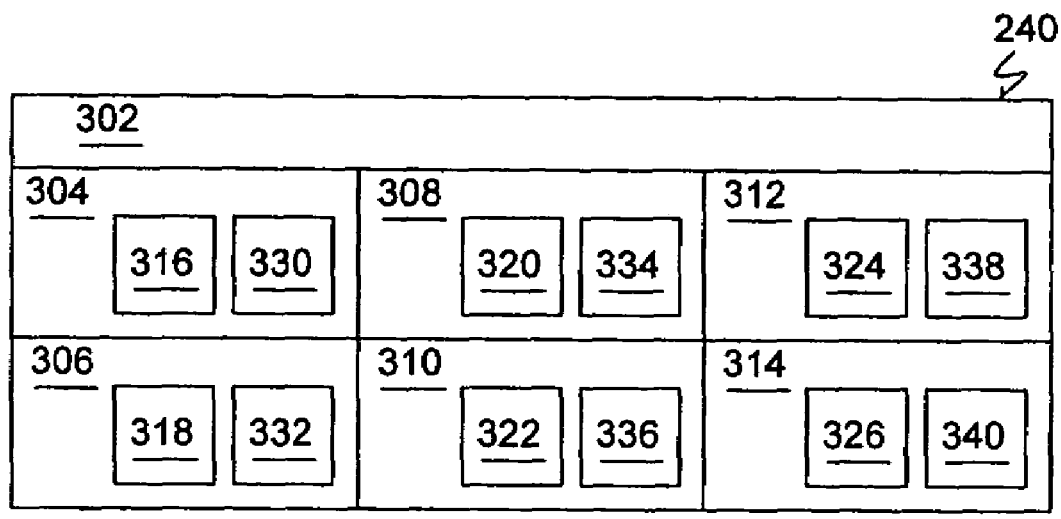
FIG. 3 illustrates a block diagram of a data structure in accordance with methods and systems consistent with the present invention.

The program includes a data structure 240 that represents a training dataset. FIG. 3 depicts a more detailed diagram of data structure 240. The sample data structure includes an entry 314 with an identifier of the training dataset, such as the name of the training dataset. The data structure also includes an entry for each monitored signal type known to that training dataset. These entries are represented by reference numerals 304–314. Each signal type entry includes an identifier of the signal type (references by numerals 316–326) and a signal value (references by numerals 330–340). As shown in the sample data structure, the signal type entries are grouped into an ordered triple, with each vertical column of signal type entries being one of the three components of the ordered triple.

Figure 4:
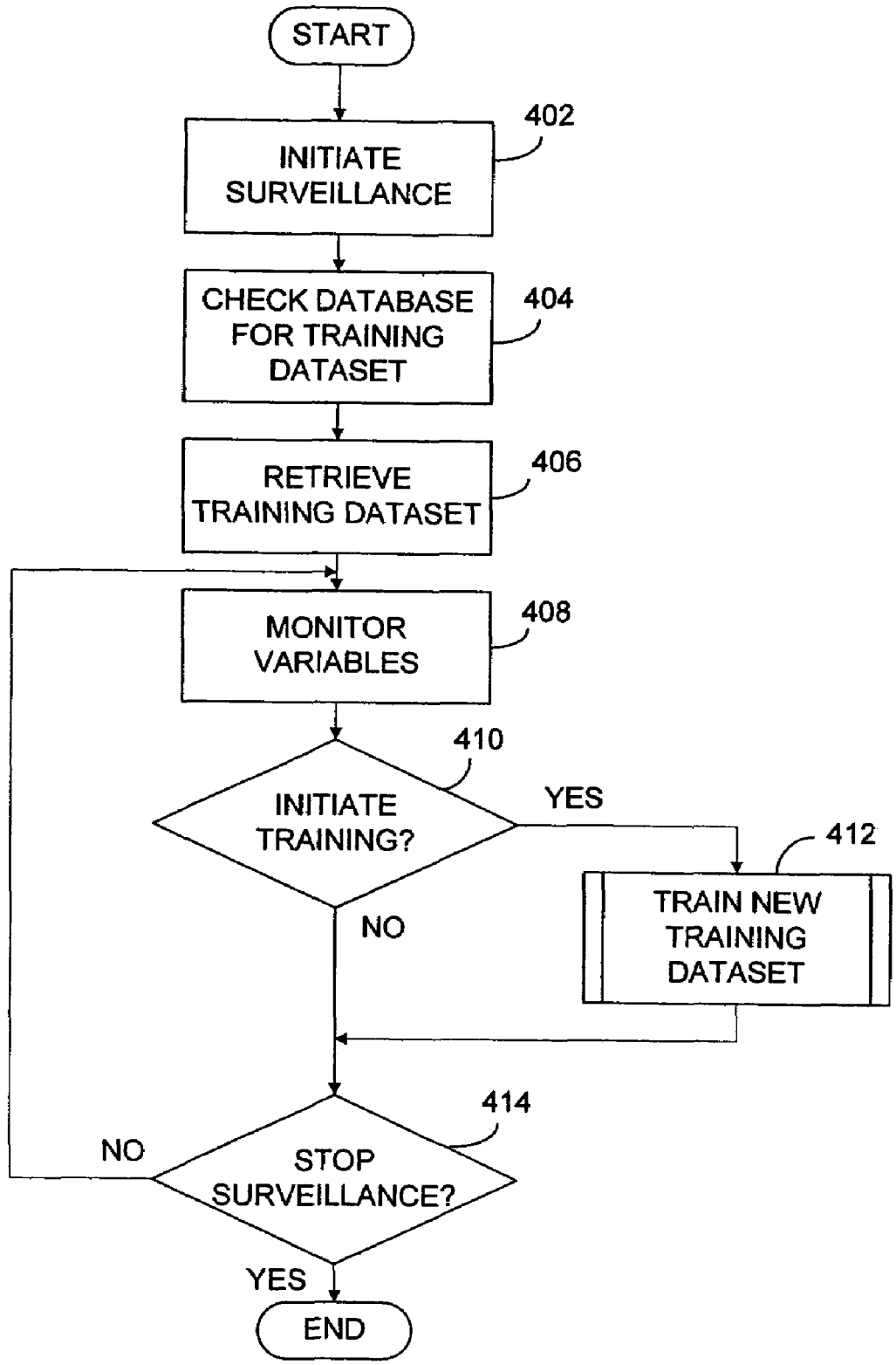
FIG. 4 depicts a flow diagram of the exemplary steps performed by the program for monitoring and training on the subject system.

FIG. 4 depicts a flow diagram illustrating the steps performed by the program to prepare a training dataset for the subject system while monitoring the subject system. In the description below, the program monitors a single subject system, but the program can also train for and monitor a plurality of subject systems via the network. One having skill in the art will appreciate that the program steps can be performed in an order different than those described below, and that the program can have a fewer or greater number of steps than described. For example, in the description, the program is placed in the surveillance mode prior to initiating the training mode. Alternatively, the program can be run in training mode to prepare a training dataset without initiating surveillance mode. Also, the program can be run in surveillance mode without initiating training mode.

The subject system can have a large number of variables that could be potentially monitored by the program. In the illustrative example, the subject system is a high-end server, for which more than 500 variables can be monitored. The variables are grouped for purposes of the illustrative example into three categories: physical variables, performance variables, and canary variables. Alternatively, the variables can have a different grouping or different variables than those described herein can be monitored.

The physical variables comprise variables relating to the physical status of the subject system, such as, for example, temperatures, voltages, currents, vibrations, environmental variables, and time-domain reflectometry readings. The performance variables comprise variables relating to the subject system performance, such as, for example, loads on the CPU and memory, throughput, queue lengths, bus saturation, FIFO overflow statistics, input/output traffic, security, and memory and cache utilization. The canary variables, which are also referred to as quality-of-service variables, comprise synthetic user transaction times and provide an indication of the sluggishness of the subject system. An example of a canary variable is a wait time, such as how long a user has to wait after clicking on a "log on" button before the user is logged onto a web page. Many of these variables are measured by physical transducers, while others are measured by virtual sensors, such as software measurements, counters, and rate meters throughout the operating system, middleware and firmware.

Some users purchase systems having reference configurations, that is, systems that include standard off-the-shelf hardware and software configurations. A majority of users, however, do not chose to purchase reference configurations. Instead, they purchase ad-hoc configurations that they may put together with a variable number of system boards, I/O boards, memory modules, software, and network interface hardware.

Methods and systems consistent with the present invention provide system monitoring of both types of users' systems by providing a database 230 of training datasets, where either a training dataset that matches the system telemetry signals or a nearest neighbor training dataset is retrieved from the database for monitoring. The database includes zero or more training datasets that preferably cover a broad number of system configurations. As will be described in more detail below, when the program is finished creating a training dataset, the program saves the newly trained dataset to the database. Thus, each time a training dataset is saved to the database, the database may cover a larger number of system configurations. Accordingly, a services organization that services a large number of systems can build the training set database, for example, by training on systems that are factory machines, at server farms, laboratory servers, internal information technology production machines, and machines operated by customers monitored by the program.

The database 230 is stored in the monitor system secondary storage. Alternatively, the database can be stored at another location, such as on a remote storage device.

For every unique configuration represented as a training dataset in the database, there is a unique ordered triple of time-series signals including the physical variables, performance variables, and canary variables. The ordered triple can be represented for example as {Phys_Vars, Perf_Vars, Canary_Vars}. Depending on the variables that are monitored, a data format other than an ordered triple can be used, and other types of variables can be used.

As described above, for subject systems, it is typically necessary to collect training data for several days to ensure the full range of subject system dynamics has been observed. During the training period, there is a finite probability that some problem will arise. Thus, in the illustrative example, the program initiates the surveillance mode to begin monitoring the subject system prior to initiating the training mode.

In the illustrative steps of FIG. 4, first, the program is placed in surveillance mode to monitor the subject system (step 402). The program is placed in surveillance mode, for example, by receiving an input from the user to do so. By initiating the surveillance mode prior to initiating the training mode, the subject system's health is monitored in real-time during the training mode. Accordingly, any previously-identified problems that occur during the training mode are identified. This is unlike conventional health monitoring systems that run exclusively in training mode or surveillance mode, but not simultaneously in both modes. Thus, in typical systems, when a problem occurs during training mode, it can go undiscovered and a less than optimal training dataset can be prepared.

After being placed in the surveillance mode in step 402, the program determines whether the ordered triple of available telemetry signals matches the ordered triples of any of the training datasets in the database (step 404). In this step, the program uses a set theory operator to compare the ordered triples of the available telemetry signals for the subject system with the configurations in the training dataset database. Each training dataset in the database is compared until a match is found. If no match is found, then a training dataset having a nearest neighbor configuration is used, as will be described in more detail below.

To perform the comparison, the program first uses a vector matching technique to find a training dataset in the database that has an equal or similar number of variables for each of the triples. For example, if the subject system has an ordered triple with 1000 physical variables, 2000 performance variables, and 10 canary variables, then the program looks for a stored training dataset having a similar number of variables. This allows the program to eliminate training datasets could not contain the desired configuration because they do not even contain a similar number of variables for each triple.

After finding the closest match in the vector sense, the program then checks each ordered triple variable of the closest match's training dataset to determine whether the variables are the same as those to be monitored on the subject system. The program does this by checking the variable header information of each closest match training set ordered triple variable to see if it matches the variable header information for each subject system ordered triple variable. For example, if the subject system ordered triple has three physical variables to be monitored including Disk 1 rotations per minute (RPM), Disk 2 RPM, and Disk 3 RPM, but the closest match does not have any variables that relate to disk speed, then the closest match in the vector sense may not be the best available match.

This process in step 404 is repeated with all of the training datasets in the database until either an exact match or a closest match is found. A training dataset that is an exact match will have equivalent variables in its ordered triples to those to be monitored on the subject system. While, a nearest neighbor training dataset's variables will be different to some degree. For example, the nearest neighbor may have a fewer or greater number of variables than the ordered triples to be monitored on the subject system.

Then, the program retrieves the exactly matching or nearest neighbor training dataset from the database (step 406). After retrieving the training dataset, the program then monitors the subject system using the retrieved training dataset (step 408). If the retrieved training dataset has more signals in any of the ordered triples (i.e, a nearest neighbor training dataset) than the subject system configuration, then those extra signals are ignored during initial surveillance. Similarly, if the nearest neighbor training dataset has fewer signals than the subject system configuration, then some signals on the subject system will not be monitored during initial surveillance. In other words, if a nearest neighbor training dataset is used, then the subject system configuration will have a fewer or greater number of signals than the training dataset until a new training dataset is created for the subject system.

The program uses an instrument harness to obtain the signals, which is a real-time telemetry system, such as the one disclosed in U.S. patent application Ser. No. 10/272,680, filed Oct. 17, 2002, which is incorporated herein by reference to the extent permitted by law. The instrumentation harness can alternatively be another suitable real-time telemetry system.

The program continuously monitors the training dataset signals (i.e., the variables identified in the training dataset's ordered triples), and uses a pattern recognition algorithm to identify any problems that occur with the subject system in real-time. The pattern recognition algorithm is, for example, a multivariate state estimation technique, such as one of the multivariate state estimation techniques described in A. Gribok, et al., "Use of Kernal Based Techniques for Sensor Validation in Nuclear Power Plants", International Topical Meeting on Nuclear Plant Instrumentation, Controls, and Human-Machine Interface Technologies 2000, Washington, D.C., November 2000, which is incorporated herein by reference. For example, the program can use a pattern recognition technique that is based on any one of ordinary least squares, support vector machines, artificial neural networks, multivariate state estimation techniques, or regularized multivariate state estimation techniques. Alternatively, the program can use other approaches for identifying problems with the subject system, such as methods based on principle components analysis, adaptive methods based on Kalman filters, or methods based on autoregressive moving averages. Pattern recognition algorithms and their use in monitoring systems are known in the art and will not be described in more detail herein.

During the training mode, the pattern recognition algorithm learns the behavior of the monitored variables and is able to estimate what each signal should be on the bases of past learned behavior and the reading from correlated variables. When the program is then placed in surveillance mode, the pattern recognition algorithm compares the monitored variables to the training dataset and identifies problems by recognizing patterns in the monitored variables.

While the program is monitoring the subject system, the program can then simultaneously initiate the training mode to build a new training dataset for the subject system (step 410). Accordingly, the subject system is monitored using the training dataset retrieved from the database, while a new training dataset is prepared. Thus, methods and systems consistent with the present invention overcome the problems of conventional training methods that do not provide for simultaneously monitoring and training on a subject system.

Figure 5:
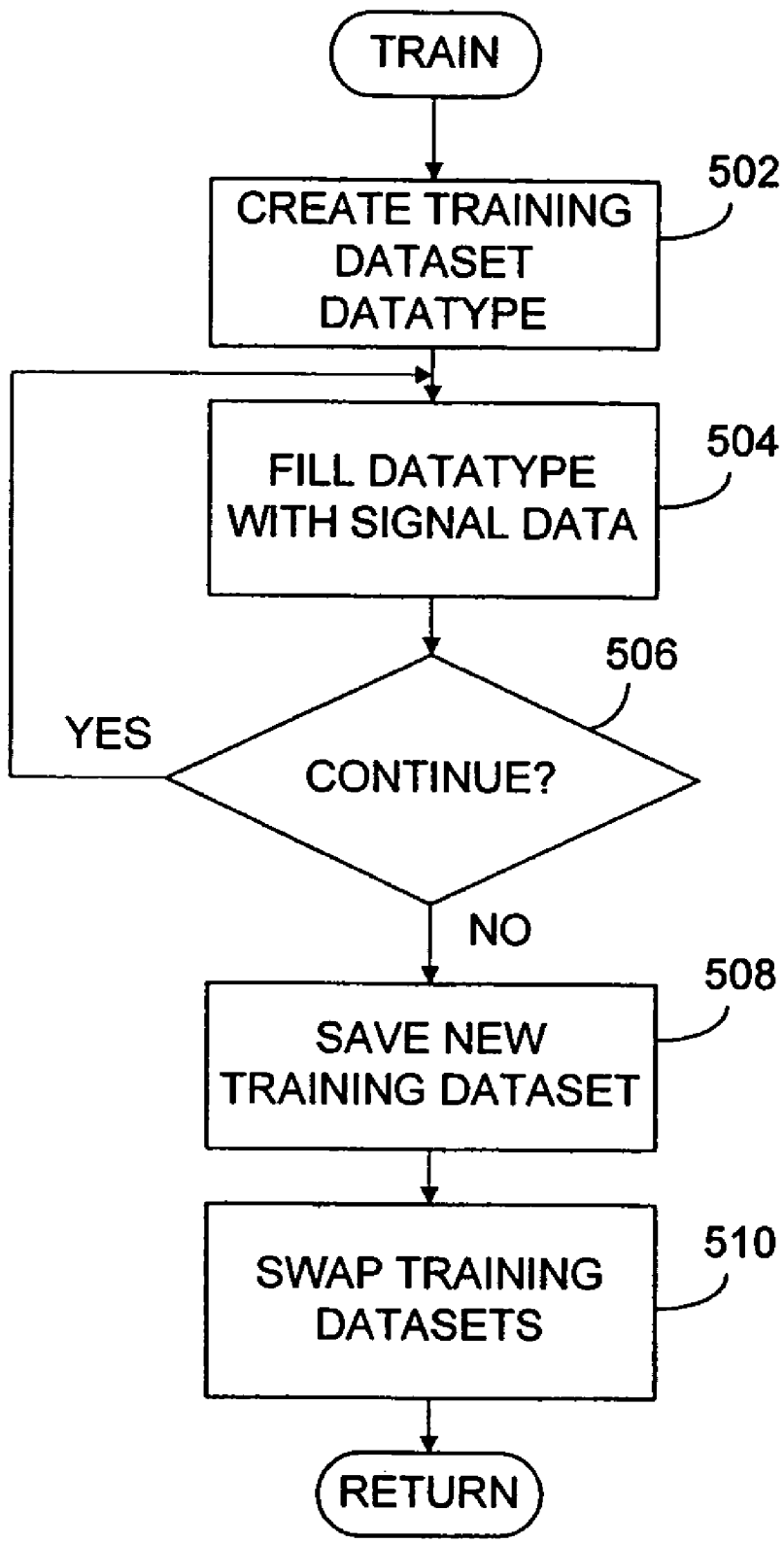
FIG. 5 depicts a flow diagram of the exemplary steps performed by the program for training on the subject system.

If the program determines in step 410 that the training mode is to be initiated, then the program creates and trains a new training dataset (step 412). FIG. 5 depicts in more detail the operations performed in step 412. In FIG. 5, first, the program creates a new training dataset for the subject system (step 502). The new training dataset includes an identifier of the subject system, and an ordered triple within which are variables for each variable monitored on the subject system. Thus, each variable, which is monitored for the subject system, is included in the new training dataset regardless of whether that variable is included in the training data set that was retrieved from the database to simultaneously perform surveillance on the subject system. Each variable in the training dataset also has a header that identifies the variable.

After the program creates the new training dataset in step 502, it begins to fill in the variables in the new training dataset with signal data acquired through monitoring the subject system (step 504). The variables are continuously updated, thus the variables will change values as the signals change values.

If no problems occur with the subject system during the training, then the result of the training is a new training dataset that defines an ideal operating state for the subject system. As can be appreciated, problems are likely to occur and these problems will be identified by the program since the program is simultaneously monitoring the subject system. If a problem is identified, it can therefore be corrected and the signals returned to a normal state while the program is still training on the subject system. Thus, the new training set will not be tainted by the problem.

The program then determines whether to continue training on the subject system (step 506). This determination is made, for example, based on input received from the user. If the program is to continue training, then processing returns to step 504 to acquire more signal data. If the program determines that the training is complete, then the program saves the new training dataset to the database (step 508).

Then, the program replaces the training dataset that was retrieved from the database to monitor the subject system with the new training dataset for purposes continuing surveillance of the subject system (step 510). Accordingly, the program will continue to monitor the subject system, however with the new training dataset, which matches the configuration of the subject system. This swapping of training datasets is transparent to the user.

Referring back to FIG. 4, after the training is complete in step 412 or if training is not to be initiated in step 410, then the program determines whether to continue the surveillance mode (step 414). If the program is to continue the surveillance mode, then processing returns to step 408. Alternatively, if the program determines that it is to stop the surveillance mode, then the program ends.

Thus, as the program is used to train on an increasing number of subject systems, the database will include training datasets for an increasing number of configuration permutations observed on the systems. Those configurations for which there is a matching training dataset will require no training period, and can be monitored with high sensitivity from the moment they are first booted up.

For any configurations that are not found in the database, then the nearest neighbor training dataset will enable immediate surveillance using a training dataset that may not be perfect, but will nevertheless give reasonable surveillance benefits for the several days that a new, customized training dataset can be built through training. After the new, configuration-specific training dataset is built, the program will transparently swap in the new training dataset in place of the nearest neighbor training dataset.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A computer-implemented method in a data processing system having a program, the method comprising the steps of:
   monitoring in real-time a plurality of signals that each describe an operating condition of a subject data processing system;
   determining whether there is a problem with the subject data processing system by comparing at least one of the monitored signals to a corresponding at least one signal in a known signal dataset, the known signal dataset comprising a signal value for at least one signal that describes an operating condition of one of a plurality of subject data processing systems; and
   preparing a new signal dataset having an entry for each monitored signal and a corresponding signal value simultaneously with monitoring the plurality of signals and determining whether there is a problem,
   wherein the known signal data set and the new signal dataset each include an ordered triple of variables.

2. The method according to claim 1, further comprising the steps of:
   choosing the known signal dataset from a plurality of known signal datasets; and
   retrieving the chosen known signal dataset.

3. The method according to claim 2, wherein the known signal dataset is chosen from the plurality of known signal datasets as having one of an exact match and a nearest match to the monitored signals of the subject data processing system among the plurality of known signal datasets.

4. The method according to claim 3, wherein the known signal dataset's at least one signal is an exact match to the monitored signals of the subject data processing system.

5. The method according to claim 3, wherein the known signal dataset's at least one signal is a nearest match to the monitored signals of the subject data processing system.

6. The method according to claim 2, wherein the known signal dataset is chosen using a set theory operator.

7. The method according to claim 1, further comprising the step of:
   after preparing the new signal dataset, replacing the known signal dataset with the new signal dataset, wherein the monitored signals are compared to the new signal dataset.

8. The method according to claim 1, further comprising the step of:
   storing the new signal dataset with the plurality of known signal datasets.

9. The method according to claim 1, wherein the monitored signals include at least one of physical variables of a physical status of the subject data processing system, performance variables of a performance of the subject data processing system, and canary variables of user transaction times with the subject data processing system.

10. The method according to claim 9, wherein the monitored signals include at least one of a temperature, a voltage, a current, a vibration, an environmental variable, a time-domain reflectometry reading, a load on a CPU, a load on a and memory, a throughput, a queue length, a bus saturation, a FIFO overflow statistic, an input/output traffic value, a security value, a memory utilization, a cache utilization, and a wait time.

11. The method according to claim 1, wherein the ordered triple of variables includes physical variables, performance variables, and canary variables.

12. The method according to claim 1, wherein a pattern recognition method is used to determine whether there is a problem with the subject data processing system.

13. The method according to claim 12, wherein the pattern recognition method is at least one of a multivariate state estimation technique, nonlinear nonparametric regression algorithm, a neural network, a component analysis method, an adaptive method based on a Kalman filter, and a method based on an autoregressive moving average.

14. A computer-readable storage medium containing instructions that cause a data processing system having a program to perform a method comprising the steps of:
   monitoring in real-time a plurality of signals that each describe an operating condition of a subject data processing system;
   determining whether there is a problem with the subject data processing system by comparing at least one of the monitored signals to a corresponding at least one signal in a known signal dataset, the known signal dataset comprising a signal value for at least one signal that describes an operating condition of one of a plurality of subject data processing systems; and
   preparing a new signal dataset having an entry for each monitored signal and a corresponding signal value simultaneously with monitoring the plurality of signals and determining whether there is a problem,
   wherein the known signal data set and the new signal dataset each include an ordered triple of variables.

15. The computer-readable medium according to claim 14, further comprising the steps of:
   choosing the known signal dataset from a plurality of known signal datasets; and
   retrieving the chosen known signal dataset.

16. The computer-readable medium according to claim 15, wherein the known signal dataset is chosen from the plurality of known signal datasets as having one of an exact match and a nearest match to the monitored signals of the subject data processing system among the plurality of known signal datasets.

17. The computer-readable medium according to claim 16, wherein the known signal dataset's at least one signal is an exact match to the monitored signals of the subject data processing system.

18. The computer-readable medium according to claim 16, wherein the known signal dataset's at least one signal is a nearest match to the monitored signals of the subject data processing system.

19. The computer-readable medium according to claim 15, wherein the known signal dataset is chosen using a set theory operator.

20. The computer-readable medium according to claim 14, further comprising the step of:

after preparing the new signal dataset, replacing the known signal dataset with the new signal dataset, wherein the monitored signals are compared to the new signal dataset.

21. The computer-readable medium according to claim 14, further comprising the step of:
storing the new signal dataset with the plurality of known signal datasets.

22. The computer-readable medium according to claim 14, wherein the monitored signals include at least one of physical variables of a physical status of the subject data processing system, performance variables of a performance of the subject data processing system, and canary variables of user transaction times with the subject data processing system.

23. The computer-readable medium according to claim 22, wherein the monitored signals include at least one of a temperature, a voltage, a current, a vibration, an environmental variable, a time-domain reflectometry reading, a load on a CPU, a load on a and memory, a throughput, a queue length, a bus saturation, a FIFO overflow statistic, an input/output traffic value, a security value, a memory utilization, a cache utilization, and a wait time.

24. The computer-readable medium according to claim 14, wherein the ordered triple of variables includes physical variables, performance variables, and canary variables.

25. The computer-readable medium according to claim 14, wherein a pattern recognition method is used to determine whether there is a problem with the subject data processing system.

26. The computer-readable medium according to claim 25, wherein the pattern recognition method is at least one of a multivariate state estimation technique, a nonlinear nonparametric regression algorithm, a neural network, a component analysis method, an adaptive method based on a Kalman filter, and a method based on an autoregressive moving average.

27. A data processing system comprising:
a memory having a program that
monitors in real-time a plurality of signals that each describe an operating condition of a subject data processing system,
determines whether there is a problem with the subject data processing system by comparing at least one of the monitored signals to a corresponding at least one signal in a known signal dataset, the known signal dataset comprising a signal value for at least one signal that describes an operating condition of one of a plurality of subject data processing systems, and
prepares a new signal dataset having an entry for each monitored signal and a corresponding signal value simultaneously with monitoring the plurality of signals and determining whether there is a problem,
wherein the known signal data set and the new signal dataset each include an ordered triple of variables; and
a processing unit that runs the program.

28. The data processing system according to claim 27, wherein the program further choose the known signal dataset from a plurality of known signal datasets and retrieves the chosen known signal dataset.

29. The data processing system according to claim 28, wherein the known signal dataset is chosen from the plurality of known signal datasets as having one of an exact match and a nearest match to the monitored signals of the subject data processing system among the plurality of known signal datasets.

30. The data processing system according to claim 29, wherein the known signal dataset's at least one signal is an exact match to the monitored signals of the subject data processing system.

31. The data processing system according to claim 29, wherein the known signal dataset's at least one signal is a nearest match to the monitored signals of the subject data processing system.

32. The data processing system according to claim 28, wherein the known signal dataset is chosen using a set theory operator.

33. The data processing system according to claim 27, wherein the program replaces the known signal dataset with the new signal dataset after preparing the new signal dataset, and wherein the monitored signals are compared to the new signal dataset.

34. The data processing system according to claim 27, wherein the program further stores the new signal dataset with the plurality of known signal datasets.

35. The data processing system according to claim 27, wherein the monitored signals include at least one of physical variables of a physical status of the subject data processing system, performance variables of a performance of the subject data processing system, and canary variables of user transaction times with the subject data processing system.

36. The data processing system according to claim 35, wherein the monitored signals include at least one of a temperature, a voltage, a current, a vibration, an environmental variable, a time-domain reflectometry reading, a load on a CPU, a load on a and memory, a throughput, a queue length, a bus saturation, a FIFO overflow statistic, an input/output traffic value, a security value, a memory utilization, a cache utilization, and a wait time.

37. The data processing system according to claim 27, wherein the ordered triple of variables includes physical variables, performance variables, and canary variables.

38. The data processing system according to claim 27, wherein a pattern recognition method is used to determine whether there is a problem with the subject data processing system.

39. The data processing system according to claim 38, wherein the pattern recognition method is at least one of a multivariate state estimation technique, a nonlinear nonparametric regression algorithm, a neural network, a component analysis method, an adaptive method based on a Kalman filter, and a method based on an autoregressive moving average.

40. A data processing system comprising:
means for monitoring in real-time a plurality of signals that each describe an operating condition of a subject data processing system;
means for determining whether there is a problem with the subject data processing system by comparing at least one of the monitored signals to a corresponding at least one signal in a known signal dataset, the known signal dataset comprising a signal value for at least one signal that describes an operating condition of one of a plurality of subject data processing systems; and
means for preparing a new signal dataset having an entry for each monitored signal and a corresponding signal value simultaneously with monitoring the plurality of signals and determining whether there is a problem,
wherein the known signal data set and the new signal dataset each include an ordered triple of variables.

41. A computer-readable memory device encoded with a program having a data structure with a plurality of entries, the program run by a processor in a data processing system, each entry comprising:

a signal data of a monitored operating condition of a monitored data processing system, the program storing the signal data in the entry while simultaneously determining whether there is a problem with the monitored data processing system by comparing the signal data to a corresponding entry in a second data structure, the second data structure having a plurality of entries that each describe an operating condition of one of a plurality of monitored data processing systems, wherein the data structure and the second data structure each include an ordered triple of variables.

* * * * *